US012136064B1

(12) United States Patent
Bloch et al.

(10) Patent No.: US 12,136,064 B1
(45) Date of Patent: Nov. 5, 2024

(54) OPTICAL PATTERN RECOGNITION FOR LOCATING OBJECTS IN AN ENVIRONMENT

(71) Applicant: Scandit AG, Zurich (CH)

(72) Inventors: Matthias Bloch, Zurich (CH); Nurie Jeong, Zurich (CH); Iciar Martinez, Madrid (ES)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/343,569

(22) Filed: Jun. 28, 2023

Related U.S. Application Data

(60) Provisional application No. 63/508,613, filed on Jun. 16, 2023.

(51) Int. Cl.
 *G06Q 10/0875* (2023.01)
 *G06Q 30/0601* (2023.01)
 *G06V 20/60* (2022.01)
 *G06V 30/142* (2022.01)

(52) U.S. Cl.
 CPC ..... *G06Q 10/0875* (2013.01); *G06Q 30/0635* (2013.01); *G06Q 30/0639* (2013.01); *G06V 20/60* (2022.01); *G06V 30/1426* (2022.01)

(58) Field of Classification Search
 CPC ........... G06Q 10/0875; G06Q 30/0635; G06Q 30/0639; G06V 30/1426; G06V 20/60
 See application file for complete search history.

(56) References Cited

U.S. PATENT DOCUMENTS

| | | | |
|---|---|---|---|
| 8,596,540 B2 | 12/2013 | Adelmann | |
| 10,846,561 B1 | 11/2020 | Floerkemeier et al. | |
| 10,963,658 B1 | 3/2021 | Bloch et al. | |
| 11,314,811 B1* | 4/2022 | Hume | G10L 15/193 |
| 2018/0150791 A1* | 5/2018 | Stansell | G06T 19/006 |
| 2018/0336514 A1* | 11/2018 | Ranjanghatmuralidhar | G06F 16/90335 |
| 2019/0043004 A1* | 2/2019 | Lesieur | G02B 27/0176 |
| 2019/0347608 A1* | 11/2019 | Hall | G06Q 10/087 |
| 2021/0405831 A1* | 12/2021 | Mourkogiannis | G06K 7/1413 |

OTHER PUBLICATIONS

King, "https://www.parcelandpostaltechnologyinternational.com/news/technology/hermes-invests-in-smartphone-barcode-scanning-technology.html", Jul. 2019, https://www.parcelandpostaltechnologyinternational.com/news/technology/hermes-invests-in-smartphone-barcode-scanning-technology.html (Year: 2019).*
Lam, "Augmented Reality Stocktaking System with RGB-D based Object Counting", Apr. 2018 (Year: 2018).*

(Continued)

*Primary Examiner* — Allen C Chein
(74) *Attorney, Agent, or Firm* — Kilpatrick Townsend & Stockton LLP

(57) ABSTRACT

Features described herein generally relate to locating objects in a scene using optical pattern recognition. Images of a scene that include objects are captured and optical patterns associated with the objects are detected and decoded. Code data for the optical patterns can be matched to search parameters matching input search criteria. The images can be displayed along with a graphic that overlays at least one of the images to indicate that an object matching the search criteria is depicted in the scene.

20 Claims, 12 Drawing Sheets

(56) References Cited

OTHER PUBLICATIONS

Scandit, "Scandit Barcode Scanner SDK 5.2 Includes MatrixScan Premium Scanning and AR Tracking Feature", 2017, https://www.scandit.com/blog/scandit-barcode-scanner-sdk-5-2-includes-matrixscan-premium-scanning-ar-tracking-feature/ (Year: 2017).*

Scandit, "Scandit Barcode Scanner SDK 5.2 Includes MatrixScan Premium Scanning and AR Tracking Feature", selected video captures, 2017, https://www.scandit.com/blog/scandit-barcode-scanner-sdk-5-2-includes-matrixscan-premium-scanning-ar-tracking-feature/ (Year: 2017).*

U.S. Appl. No. 17/890,087, filed Aug. 17, 2022, Inventors: Matthias Bloch, Ugur Kart.

U.S. Appl. No. 18/053,991, filed Nov. 9, 2022, Inventors: Fabian Nater, Kimmo Roimela, Bernd Schoner, Matthias Bloch.

\* cited by examiner

OPTICAL PATTERN RECOGNITION FOR LOCATING OBJECTS IN AN ENVIRONMENT

CROSS-REFERENCE TO RELATED APPLICATIONS

This application claims the benefit of and priority to U.S. Provisional Application No. 63/508,613 filed on Jun. 16, 2023, the contents of which is incorporated by reference for all purposes.

BACKGROUND

This disclosure generally relates to mobile devices. Particularly, and without limitation, this disclosure relates to finding objects in an environment using the camera in the mobile device. Objects in various environments are sometimes labeled with a barcode for tracking those objects within the respective environments. Traditionally, the tracking has been facilitated using a specialized scanner such as a laser-based barcode scanner to decode these barcodes. With the widespread adoption of mobile devices and other computing devices that include cameras, users have found it convenient to decode barcodes by capturing images of the barcodes using the cameras included in these devices. An example of a method for using a smartphone to decode a barcode is provided in U.S. Pat. No. 8,596,540, granted on Dec. 3, 2013.

BRIEF SUMMARY

Some embodiments described herein pertain to finding objects in an environment using optical pattern recognition.

Some embodiments include a system that includes a camera and a computer readable storage medium storing instructions that, when executed by one or more processors, cause the one or more processors to perform operations including: capturing, using the camera, a plurality of images depicting a plurality of optical patterns; detecting, within at least one image of the plurality of images, an optical pattern of the plurality of optical patterns; decoding the optical pattern to obtain code data; extracting, from a database, an entry corresponding to the code data, the entry comprising a set of data; accessing a search parameter, the search parameter derived from search criteria received from a user; ascertaining that a piece of data included in the set of data matches the search parameter; and in response to ascertaining that the piece of data included in the set of data matches the search parameter, displaying, on a display, the plurality of images and a graphic overlaying at least one image of the plurality of images.

In some embodiments, the graphic includes a plurality of graphical elements, wherein a first graphical element of the plurality of graphical elements provides an indication that the optical pattern has been decoded and a second graphical element of the plurality of graphical elements provides an indication that the optical pattern matches the search criteria, wherein a color of a portion of the first graphical element is different that a color of a portion of the second graphical element.

In some embodiments, a graphical element of the plurality of graphical elements provides an indication of a quantity of optical patterns that have been decoded that match the search criteria.

In some embodiments, a graphical element of the plurality of graphical elements includes a button that, when selected, causes a graphical carousel comprising a list of objects matching the search criteria to overlay the image.

Some embodiments include a method that includes capturing, using a camera, a plurality of images depicting a plurality of optical patterns; detecting, within at least one image of the plurality of images, an optical pattern of the plurality of optical patterns; decoding the optical pattern to obtain code data; extracting, from a database, an entry corresponding to the code data, the entry comprising a set of data; accessing a search parameter, the search parameter derived from search criteria received from a user; ascertaining that a piece of data included in the set of data matches the search parameter; and in response to ascertaining that the piece of data included in the set of data matches the search parameter, displaying, on a display, the plurality of images and a graphic overlaying at least one image of the plurality of images.

In some embodiments, the graphic includes a plurality of graphical elements, wherein a first graphical element of the plurality of graphical elements provides an indication that the optical pattern has been decoded and a second graphical element of the plurality of graphical elements provides an indication that the optical pattern matches the search criteria, wherein a color of a portion of the first graphical element is different that a color of a portion of the second graphical element.

In some embodiments, a graphical element of the plurality of graphical elements provides an indication of a quantity of optical patterns that have been decoded that match the search criteria.

In some embodiments, a graphical element of the plurality of graphical elements includes a button that, when selected, causes a graphical carousel comprising a list of objects matching the search criteria to overlay the image.

In some embodiments, a graphical element of the plurality of graphical elements provides an indication that each object of the plurality of objects has been found.

In some embodiments, a search criterion of the search criteria includes a stock-keeping-unit number associated with a barcode and information describing an object associated with the barcode.

In some embodiments, each optical pattern of the plurality of optical patterns is affixed to an object located on a shelf in a retail environment.

In some embodiments, the entry includes a map location for navigating to an object corresponding to the entry.

In some embodiments, the search criteria correspond to a plurality of objects.

In some embodiments, the search criteria is received from a user in response to displaying, on the display, a graphical user interface page for inputting the search criteria.

Some embodiments include one or more non-transitory computer-readable media storing computer-readable instructions that, when executed by one or more processors, cause a system to perform operations including capturing, using a camera, a plurality of images depicting a plurality of optical patterns; detecting, within at least one image of the plurality of images, an optical pattern of the plurality of optical patterns; decoding the optical pattern to obtain code data; extracting, from a database, an entry corresponding to the code data, the entry comprising a set of data; accessing a search parameter, the search parameter derived from search criteria received from a user; ascertaining that a piece of data included in the set of data matches the search parameter; and in response to ascertaining that the piece of data included in the set of data matches the search parameter, displaying, on a display, the plurality of images and a graphic overlaying at least one image of the plurality of images.

In some embodiments, the operations further include in response to ascertaining that the piece of data included in the set of data does not match the search parameter, displaying, on the display, the plurality of images and a graphic overlaying at least one image of the plurality of images, graphic providing an instruction to change a field of view of the camera.

In some embodiments, the graphic includes a plurality of graphical elements, wherein a graphical element of the plurality of graphical elements provides an indication that the optical pattern matches the search criteria.

In some embodiments, a graphical element of the plurality of graphical elements includes a graphical carousel comprising a plurality of slides, at least one slide of the plurality of slides corresponding to an object having an optical pattern that matches the search criteria and including an indicator that the object matches the search criteria.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
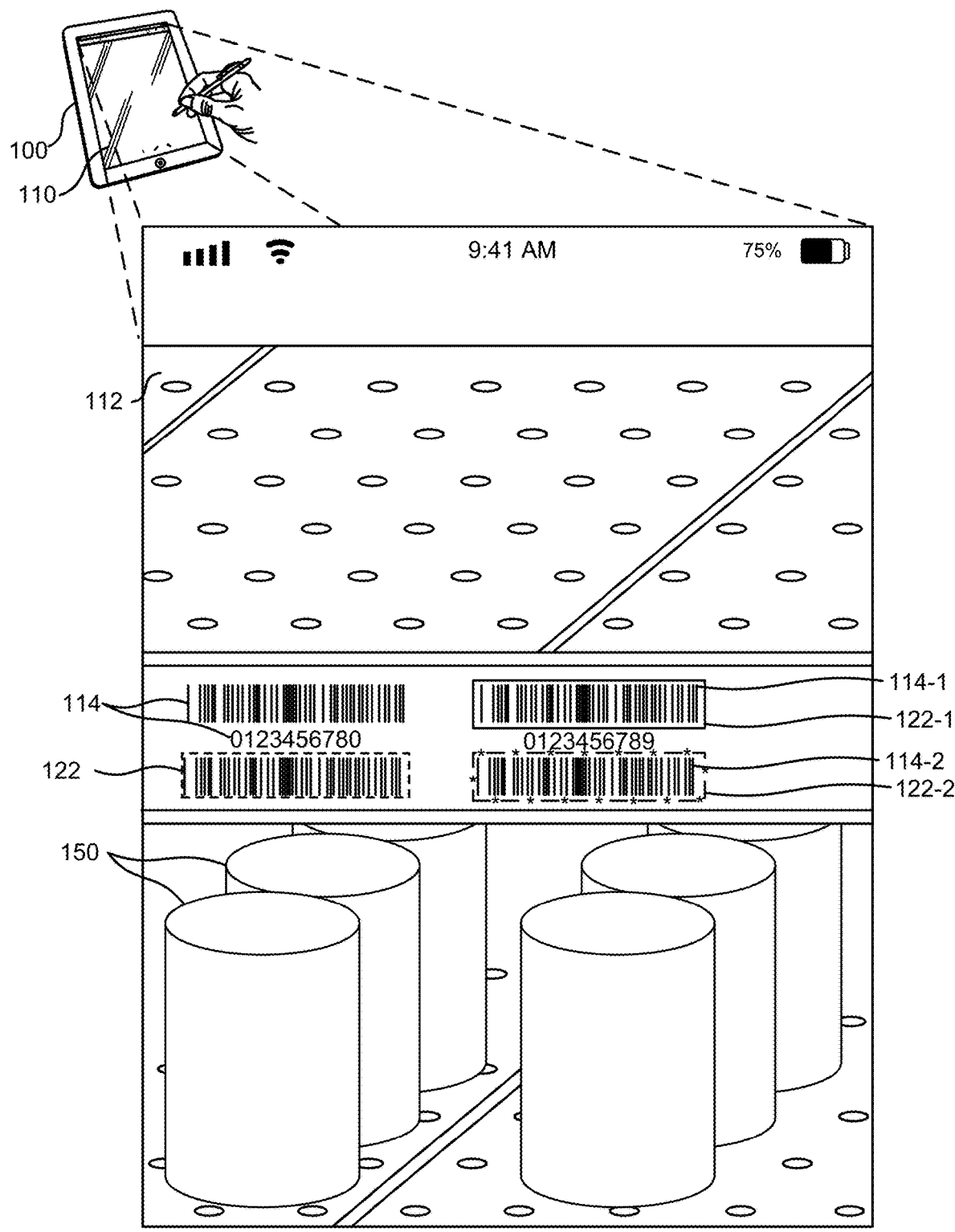
FIG. 1 depicts an example technique for automated recognition and decoding of a pattern in an image containing multiple patterns according to some implementations of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

People working in retail, logistics companies, and fulfillment centers often struggle to find the items that they need to pick and/or pack. Often the items are located on shelves in a storage area or warehouse next to similar-looking items. For example, pepper is often located on a shelf near other similar looking spices such as cinnamon and nutmeg. Combined with time constraints and lack of adequate information such as acceptable substitutions, it can lead to errors in fulfilling online orders, or providing adequate customer support to in-store shoppers. Users have found augmented reality (AR) to be convenient in assisting users in navigating and locating objects in an environment. However, designing custom AR experiences on mobile phones requires a comprehensive understanding of the business processes, user experience, and computer vision. Retailers and logistics companies often lack the necessary resources and expertise within their organization to effectively implement user-friendly AR solutions. Developing a custom AR solution from scratch can also be a time-consuming process that can involve several man-months of effort. In many cases, implementing custom AR experiences presents a unique challenge since it typically requires a complete overhaul of traditional user interfaces and interactions.

The developed approach overcomes these challenges and others by providing techniques for finding objects in an environment using optical pattern recognition. The developed approach offers a user interface that reduces the need for users to invest significant time and resources in building their own AR solutions from scratch. The developed approach is positioned as a smart enabler that uses AR overlays to visually aid users in spotting what they are looking for faster. For example, the AR overlays can indicate items that are scanned but do not match a search term and items that are scanned but that do match a search term. Using the developed approach, users can search for objects of interest in less time and with greater accuracy.

The developed approach begins with capturing images of a scene that includes objects. The objects can be located on a shelf in an environment (e.g., a retail environment). In some implementations, an optical pattern can be affixed to each of the objects. In other implementations, an optical pattern can be affixed on an object that is associated with each of the objects (e.g., affixed to the shelf supporting the object). The images can be captured using a camera of the user device. Optical patterns in the images can be detected and decoded to obtain code data for the detected optical patterns. An entry corresponding to the code data for an optical pattern can be extracted from a database. The entry can include a set of data and a map location for navigating to an object corresponding to the entry. A search parameter is accessed. The search parameter can be derived from search criteria received from a user. The search criteria can be received from a user in response to displaying, on the display, a graphical user interface page for inputting the search criteria. The graphical user interface page can include a section for inputting the search criteria and a section for presenting a list of search criteria that has been input. A user can interact with the graphical user interface page to input the search criteria. The search criteria can include, but is not limited to, text describing one or more objects, an image showing one or more objects, and one or more codes associated with one or more objects (e.g., SKU number, barcode, UPC). It can be ascertained whether a piece of data included in the set of data matches the search parameter. The images can be displayed on a display along with a graphic that overlays at least one of the images.

The graphic can include multiple graphical elements. In some implementations, graphical elements can include a first graphical element that provides an indication that the optical pattern has been decoded and a second graphical element that provides an indication that the optical pattern matches the one or more search criteria. A color of a portion of the first graphical element can be different from a color of a portion of the second graphical element. In some implementations, the graphical elements can include a graphical element that provides an indication of a quantity of optical patterns that have been decoded that match the search criteria. In some implementations, the graphical elements can also include a button that, when selected, causes a graphical carousel comprising a list of objects matching the criteria to overlay the image and a graphical element that provides an indication that each object of the objects corresponding to the search criteria has been found.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depicts the real-world scene as viewed through the field of view of the camera. The real-world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in commonly owned U.S. patent application Ser. No. 16/905,722, filed on Jun. 18, 2020, which is incorporated by reference in its entirety for all purposes. Optical patterns can also be tracked, as described in commonly owned U.S. patent application Ser. No. 16/920,061, filed on Jul. 2, 2020, which is incorporated by reference in its entirety for all purposes.

Figure 2:
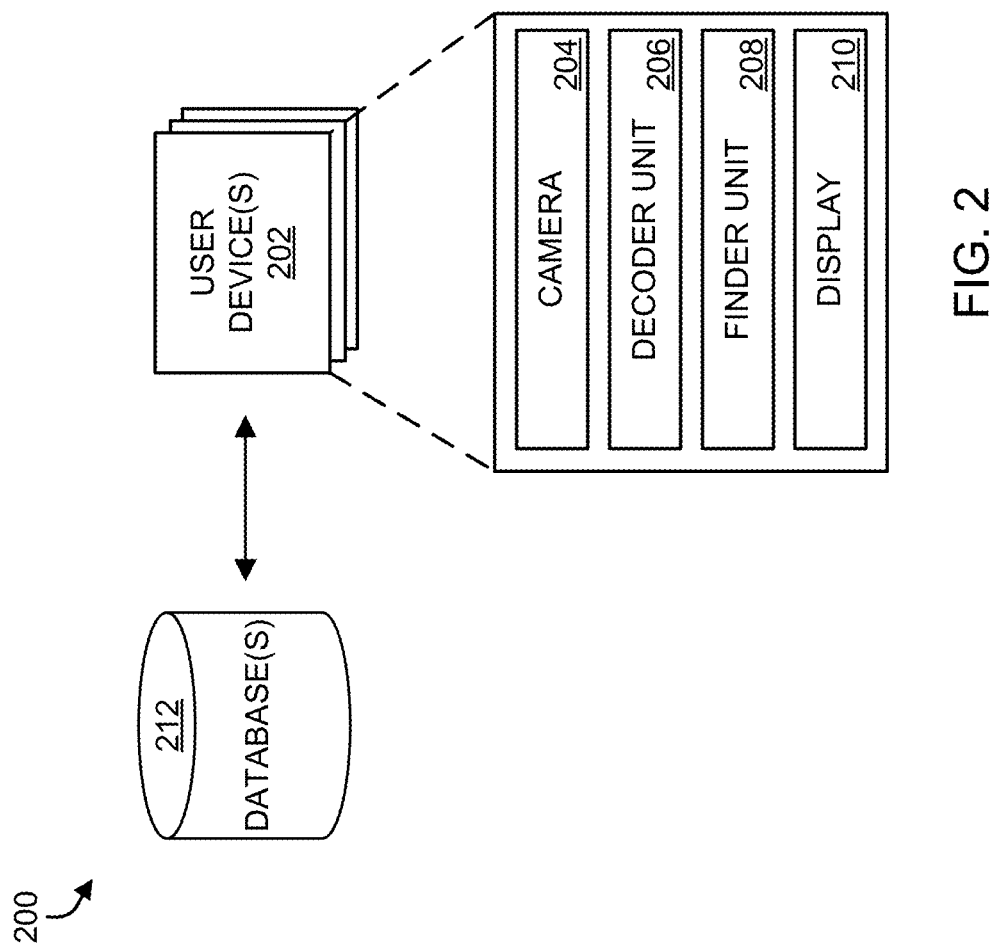
FIG. 2 depicts an embodiment of a system for finding objects in an environment using optical pattern recognition according to some implementations of the present disclosure.

FIG. 2 depicts an embodiment of a system 200 for finding objects in an environment using optical pattern recognition. As shown in FIG. 2, the system 200 can include one or more user devices 202 (referred to herein as "user device 202") and one or more databases (referred to herein as "database 212") that are in communication with each other. In some implementations, the user device 202 and database 212 can be in communication with each other via a network (not shown). The network can be any kind of network, wired or wireless, which can facilitate communications among components of the system 200. For example, the network can facilitate communication between and among the user device 202 and the database 212. The network can include one or more public networks, one or more private networks, and any combination thereof. Additionally, the network can be a local area network, a wide area network, the Internet, a Wi-Fi network, a Wi-Fi Direct network, a Bluetooth network, a combination thereof, and the like. The foregoing arrangements of the network are not intended to be limiting and the network can be configured in other ways. For example, the network can be based on the following technologies: Matter technologies; ZigBee technologies; IrDA technologies; RFID technologies; NFC technologies; WLAN technologies; Z-wave technologies; UWB technologies; ANT and ANT+ technologies; 3G communication technologies; 4G communication technologies; 5G communication technologies; 6G communication technologies, a combination thereof, and the like.

The database 212 can store a catalog of objects that are located in an environment and a map of the environment. The map can have a map coordinate system. The catalog can include multiple entries with each entry corresponding to a different respective object. Each entry can include a set of data for the respective object in which the entry corresponds to. The set of data for an object can include, but not limited to, an identifier for the object, a description of the object, a category for the object, code data associated with the object, and a map location for the object. The identifier for the object can be used to identify the object with respect to other entries for other objects in the environment. For example, an entry for a first object can include the identifier "Object #1" for the first object. Similarly, an entry for a second object can include the identifier "Object #2" for the second object. The description of the object can be used to textually describe the object. For example, the first object can be a container that holds the spice pepper and the description for the first object can be "Pepper". Similarly, the first object can be a container that holds the spice paprika and the description for the second object can be "Paprika." The category for the object can be used to categorize the object. For example, continuing with the above example, both the first and second objects can be categorized as a "Spice" since the contents of both containers are spices. The code data for the object can include data representing a stock-keeping-unit (SKU) number, a barcode, a universal product code (UPC), a combination thereof, and the like. In some implementations, the one or more codes can be printed or painted on the object, etched into the object, affixed to the object using a label or sticker, and the like. In other implementations, the one or more codes can be printed or painted on an object supporting the object, etched into the object supporting the object, affixed to the object supporting the object using a label or sticker, and the like. The map location for the object can be used to identify where in the environment the object is located. The map location can include map coordinates of the map coordinate system. In some implementations, the map coordinates can identify where the object is located in the environment with respect to a reference location in the map coordinate system. In other implementations, the map coordinates can identify where the object is located in the environment with respect to the location of a reference object in the environment. In the case of the environment including a shelving system, the map coordinates can identify which shelf the object is located on and where on the shelf the object is located. In some implementations, an entry for an object can include an image depicting the object. An example entry for a container of the spice pepper is as follows:

Identifier: Object #1
Description: Pepper
Category: Spice
Code Data: [Barcode; SKU; UPC]
Location: [Map Coordinates]
Image: [Image Depicting The Object]

In some implementations, the database 212 can store catalogs of objects that are located in one or more environments and one or more maps for each environment. In this case, each map can have a map coordinate system and each catalog can include multiple entries with each entry in each catalog corresponding to a different respective object. Each entry can include a set of data for the respective object in which the entry corresponds to. The set of data for an object can include, but not limited to, an identifier for the object, a description of the object, a category for the object, code data associated with the object, and a map location for the object.

Figure 10:
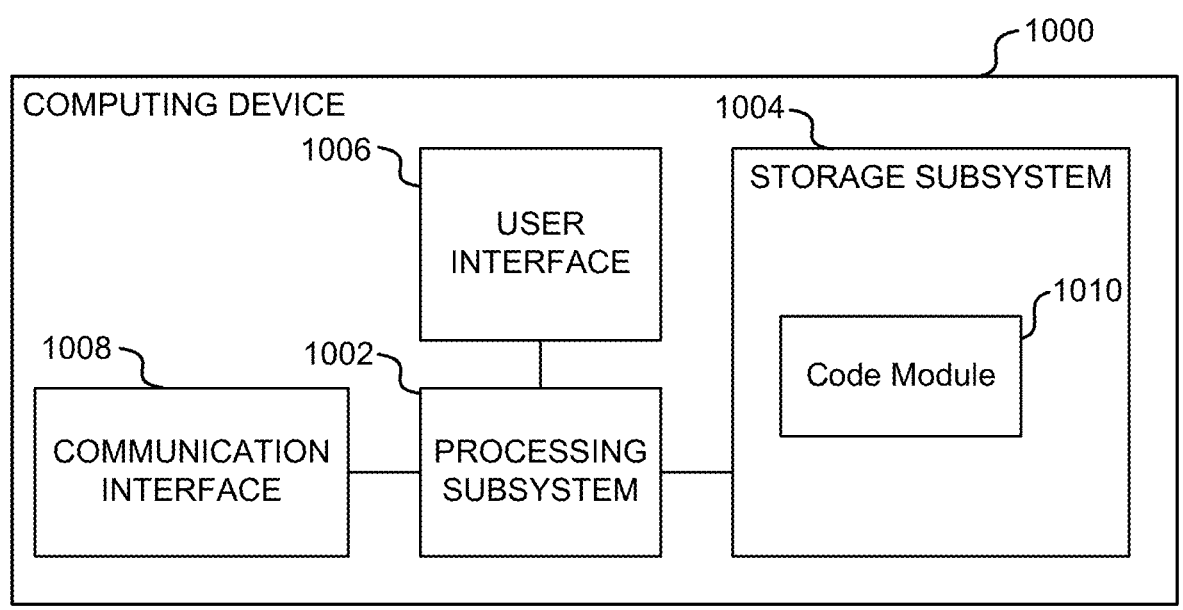
FIG. 10 depicts a block diagram of an embodiment of a computer system according to some implementations of the present disclosure.

The user device 202 can include a camera 204, a decoder unit 206, a finder unit 208, and a display 210. The user device 202 can be implemented in various configurations to provide various functionality to a user. For example, the user device 202 can be implemented as the computing device 1000 (FIG. 10). In other examples, the user device 202 can be implemented as a communication and/or computing device such as a mobile phone and tablet computer. The foregoing implementation is not intended to be limiting and the user device 202 can be implemented as any kind of electronic device that can be configured to find objects in an environment using a part of or all the techniques disclosed herein.

The camera 204 is configured to capture images of a scene. In some implementations, the scene can include an environment surrounding the user device 204. In some implementations, the environment can be a portion of a retail environment that includes a portion of a shelving system. The shelving system can include multiple shelving units with each shelving unit including multiple shelves for supporting objects. Each object or shelf supporting each object can be affixed with an optical pattern. The images captured by the camera 204 can depict objects that are in the scene and the optical patterns associated with those objects. For example, the camera 204 can capture images of shelves of a shelving unit. The images can depict the shelves, objects supported by the shelves, and optical patterns that are affixed to the objects themselves or the shelves supporting the objects. In some implementations, the images can be continuously captured and form part of a sequence of images such as frames of a video. The captured images can be displayed on the display 210 of the user device 204 such that the objects and optical patterns associated with those objects can be viewed by a user of the user device 204. In some implementations, as described in more detail below, the captured image can be displayed with one or more graphics overlaying the image. In some implementations, the captured images can be displayed in real-time such that the user of the user device 202 can be presented with a viewfinder and/or live view of the scene. In some implementations, as described in more detail below, the user can use the viewfinder and/or live view of the scene to navigate through the retail environment. In some implementations, the captured images can be stored in a memory (not shown) of the user device 202 and/or in a remote database such as a cloud-server and accessed at a later time for viewing and/or processing.

The decoder unit 206 is configured to detect optical patterns depicted in images and decode the detected optical patterns to obtain code data for the detected optical patterns. In some implementations, the images can be the images captured by the camera 204. In other implementations, the images can be images that are retrieved from another source such as database or server. A detailed description of detecting and decoding multiple optical patterns depicted in images is described in commonly owned U.S. Pat. No. 10,963,658, which is hereby incorporated by reference in its entirety and for all purposes. In some implementations, the decoder unit 206 can be configured to detect optical patterns from a single image. In other implementations, the decoder unit 206 can be configured to detect optical patterns from multiple images. In some implementations, the decoder unit 206 can be configured to accumulate a predetermined number of images and detect and decode optical patterns from the predetermined number of images. In some implementations, the decoder unit 206 can be configured to use the predetermined number of images to determine whether the scene is shifting and/or any objects in the scene are exhibiting motion blur and use a first detector/decoder if the scene shifting and/or any objects in the scene are exhibit motion blur less than a predetermined threshold and use a second detector/decoder if the scene is shifting and/or any objects in the scene are exhibiting motion more than the predetermined threshold. A detailed description of tracking multiple optical patterns in multiple captured images is described in commonly owned U.S. patent application Ser. No. 17/890,087, filed on Aug. 17, 2022, which is hereby incorporated by reference in its entirety and for all purposes. The code data for the optical patterns can be stored in a memory (not shown) of the user device 202 and/or in a remote database such as a cloud-server and accessed at a later time for viewing and/or processing.

In some implementations, the decoder unit 206 can be configured to determine a number of optical patterns detected in an image or field of view of the camera 204, determine a number of optical patterns decoded in the image or field of view, and compare the number of optical patterns detected in the image or field of view to the number of optical patterns decoded in the image or field of view. In some implementations, the decoder unit 206 can be configured to generate a first instruction in response to determining that the number of optical patterns detected in the image or field of view is less than the number of optical patterns decoded in the image or field of view. In some implementations, the decoder unit 206 can be configured to generate the first instruction in response to determining that a ratio of the number of optical patterns decoded in the image or field of view to the number of optical patterns detected in the image or field of view is equal to or less than a predetermined amount (e.g., 95, 90, 80, 85, etc.). In some implementations, the decoder unit 206 is configured to display first instruction as a graphic that overlays at least one displayed image. In some implementations, the first instruction can be a "Move closer" instruction and the decoder unit 206 can be configured to generate a graphic that includes the text "Move closer" and overlay the graphic on the live view of the scene displayed on the display 210.

In some implementations, the decoder unit 206 can be configured to generate a second instruction in response to determining that the number of optical patterns detected in the image or field of view is equal or less than a predetermined threshold (e.g., 1, 2, 3, etc.) and/or the determining that the number of optical patterns decoded in the image or field of view is equal to the number of optical detected in the image or field of view. In some implementations, the decoder unit 206 is configured to display the second instruction as a graphic that overlays at least one displayed image. In some implementations, the second instruction can be a "Move back" instruction and the decoder unit 206 can be configured to generate a graphic that includes the text "Move back" and overlay the graphic on the captured images of the scene displayed on the display 210.

In some implementations, the decoder unit 206 can be configured to continuously determine the number of optical patterns detected and decoded in images captured by the camera 204 and generate the first instruction and/or second instruction as discussed above. In some implementations, the decoder unit 206 can continue to generate the first instruction and/or second instruction until the number of optical patterns detected in the images is equal to or greater than a predetermined threshold (e.g., 5, 6, 7) and the ratio of the number of optical patterns detected to the number of optical patterns decoded is equal to or greater than a predetermined threshold (e.g., 80, 85, 90, 95, etc.).

The finder unit 206 is configured to find objects of interest in the scene using a part of or all of the techniques disclosed herein. The finder unit 206 can include one or more general-purpose processors or special-purpose processors that are specifically designed to perform the functions of the finder unit 206. Such special-purpose processors can be application-specific integrated circuits (ASICs), field-programmable gate arrays (FPGAs), and programmable logic devices (PLDs) which are general-purpose components that are physically and electrically configured to perform the functions detailed herein. Such general-purpose processors can execute special-purpose software that is stored using one or more non-transitory processor-readable mediums, such as random-access memory (RAM), flash memory, a hard disk drive (HDD), or a solid-state drive (SSD). Examples of general-purpose processors include microprocessors, microcontrollers, central processing units, graphical processing units, digital signal processors, ASICs, FPGAs, PLDs, or any combination thereof. The general-purpose processors can include a plurality of cores, a plurality of arrays, one or more coprocessors, and/or one or more layers of local cache memory.

In order to find objects of interest in the scene, the finder unit 206 is configured to extract one or more entries corresponding to the code data decoded by the decoder unit 206 from the entries stored in the database 212. The finder unit 206 can extract one or more entries by comparing the code data decoded by the decoder unit 206 to code data included in the database 212 entries and extracting one or more entries from the database 212 entries in which the code data included in the one or more entries matches the code data decoded by the decoder unit 206. In this way, the finder unit 206 can determine which optical patterns depicted in the images correspond to an entry stored in the database 202. As described above, each database 212 entry can include a set of data for the respective object in which the entry corresponds to. The set of data for an object can include, but not limited to, an identifier for the object, a description of the object, a category for the object, code data associated with the object, and a map location for the object.

The finder unit 206 is further configured to ascertain whether a piece of data included in the set of data or sets of data corresponding to the one or more extracted entries matches a search parameter. In some implementations, the search parameter can be derived from search criteria received from a user, stored in a memory (not shown) of the user device 202 and/or in a remote database such as a cloud-server, and accessed by the finder unit 206. The search criteria can be received from a user in response to displaying, on the display 210 of the user device 202, a graphical user interface page for inputting the search criteria.

Figure 3:
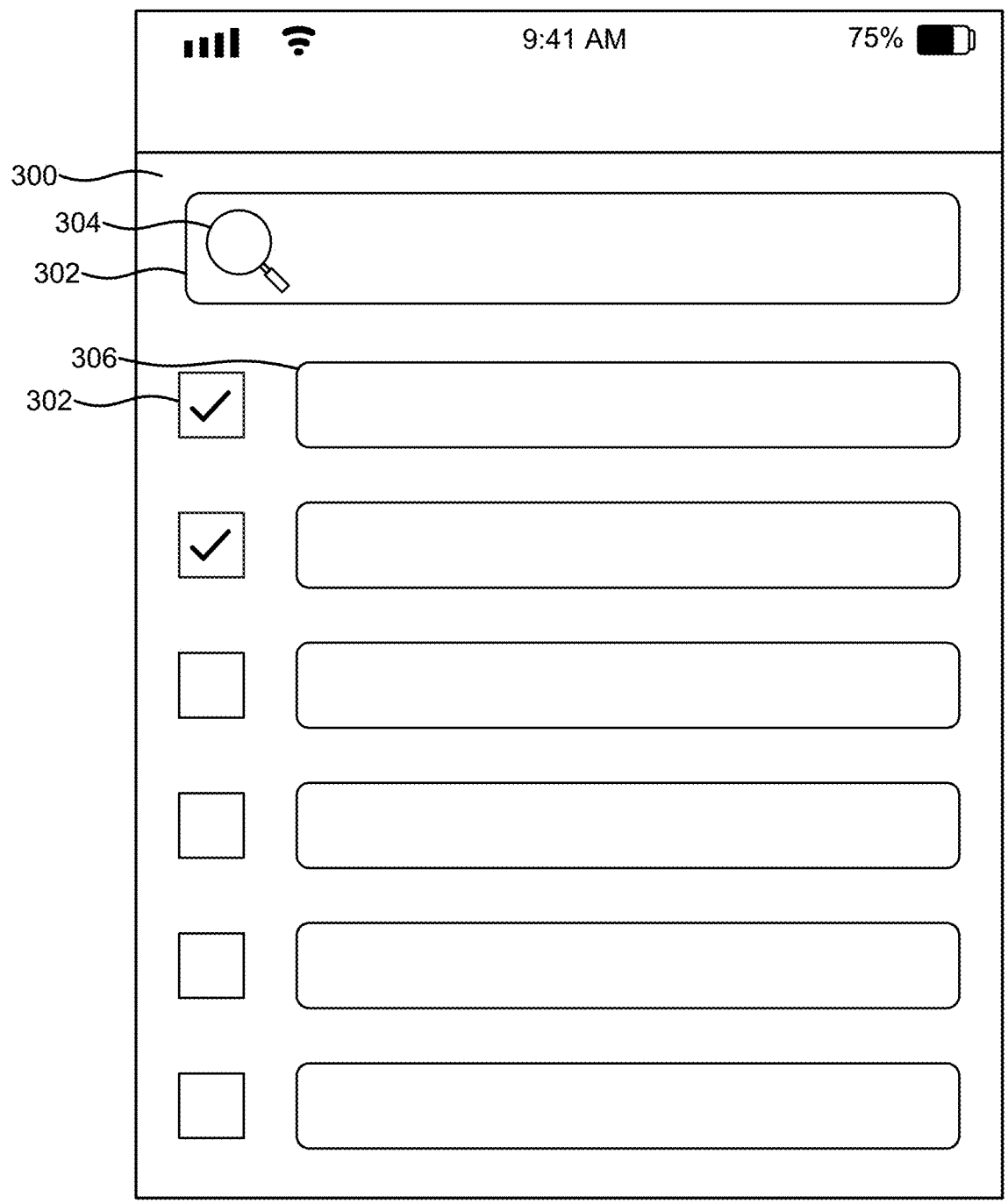
FIG. 3 illustrates an example of a graphical user interface page for managing search criteria according to some implementations of the present disclosure.

FIG. 3 illustrates an example of a graphical user interface page 300 for managing search criteria. As shown in FIG. 3, the graphical user interface page 300 includes a search field 302 for inputting information corresponding to the search criteria and a section 306 for presenting a list of search criteria that has been input. To input information corresponding to the search criteria, a user can interact with the graphical user interface page 300 to select the search icon 304. In some implementations, the user can interact with the graphical user interface page 300 using a touch input received by a touchscreen display of the display 210. In other implementations, the user can interact with the graphical user interface page 300 using a voice command received by an audio system (not shown) of the user device 202. Upon selecting the search icon 304, information corresponding to the search criteria can be input by the user. In some implementations, the information corresponding to the search criteria can include, but not limited to, text describing one or more objects, an image showing one or more objects, and one or more codes associated with one or more objects (e.g., SKU number, barcode, UPC). For example, upon selecting the search icon 304, the user can capture, using the camera 204, an image depicting objects and optical patterns associated with the objects. The optical patterns can be detected and decoded by the decoder unit 206 and the code data corresponding to the optical patterns can serve as search criteria. In some implementations, the search criteria can correspond to expiration dates of objects (e.g., all objects expiring in the next three days); one or more characteristics of objects (e.g., all shoes listed in database 212 entries that are red and have the size 42, all food items listed in database 212 entries that are gluten free and on sale); and/or delivery dates of objects (e.g., all objects corresponding to an online order to be delivered in a delivery time window). In some implementations, when the search icon 304 is selected, the user device 202 can poll the database 212 to determine objects listed in database 212 entries having a characteristic corresponding to the search criteria. The foregoing search criteria examples are not intended to be limiting and other search criteria may be used.

The section 306 for presenting a list of search criteria can be populated with information corresponding to the search criteria input in the search field 302. In some implementations, the section 306 can be populated with text describing the search criteria, one or more images depicting objects corresponding to the search criteria, one or more barcodes associated with objects corresponding to the search criteria, and the like. In some implementations, the user can refine the search criteria by toggling (e.g., checking and/or unchecking) checkboxes 308 corresponding to the listed search criteria. For example, by unchecking a checkbox 308 associated with a particular search criterion, that particular search criterion can be excluded from the search. Similarly, by checking a checkbox 308 associated with a particular search criterion, that particular search criterion can be included in the search.

Upon receiving the search criteria, the finder unit 208 can be configured to process the received search criteria into a search parameter. In the case of search criteria received as text, the finder unit 208 can be configured to convert the text into a numerical value by generating an embedding for the characters of the text. In the case of search criteria received as an image, the finder unit 208 can be configured to convert the image into a one-dimensional vector by extracting features of the image. In the case of search received as a barcode, the finder unit 208 can be configured to decode the barcode into code data. In some implementations, the barcode can be decoded into code data using the decoder unit 206.

The finder unit 208 can also be configured to display the captured images of the scene. As described above, the images can be continuously captured and form part of a sequence of images such as frames of a video. The captured images and/or video can be displayed on the display 210 of the user device 204 such that the objects and optical patterns associated with those objects can be viewed by a user of the user device 204. In some implementations, the captured images can be displayed in real-time such that the user of the user device 202 can be presented with a viewfinder and/or live view of the scene.

In response to ascertaining that the piece of data included in the set of data or sets of data corresponding to the one or more extracted entries matches the accessed search parameter, the finder unit 208 can be configured to display the captured images of the scene along with a graphic that overlays at least one displayed image. The graphic can include multiple graphical elements. In some implementations, the graphical elements can include a first graphical element that provides an indication that the optical pattern has been decoded and a second graphical element that provides an indication that the optical pattern matches the one or more search criteria. A color of a portion of the first graphical element can be different from a color of a portion of the second graphical element.

Figure 4:
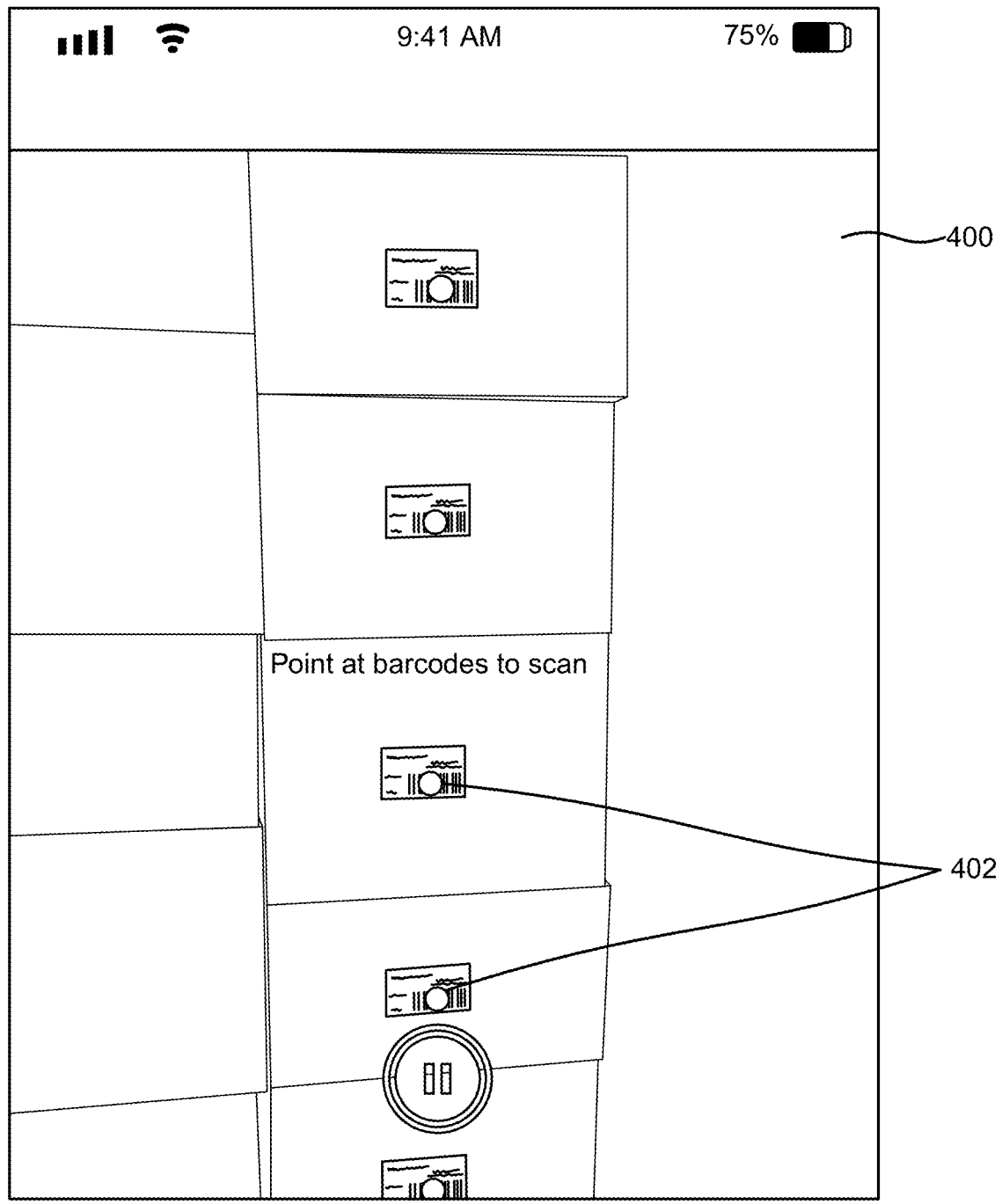
FIG. 4 illustrates an example of a graphical user interface page showing optical patterns that have been decoded according to some implementations of the present disclosure.
Figure 5:
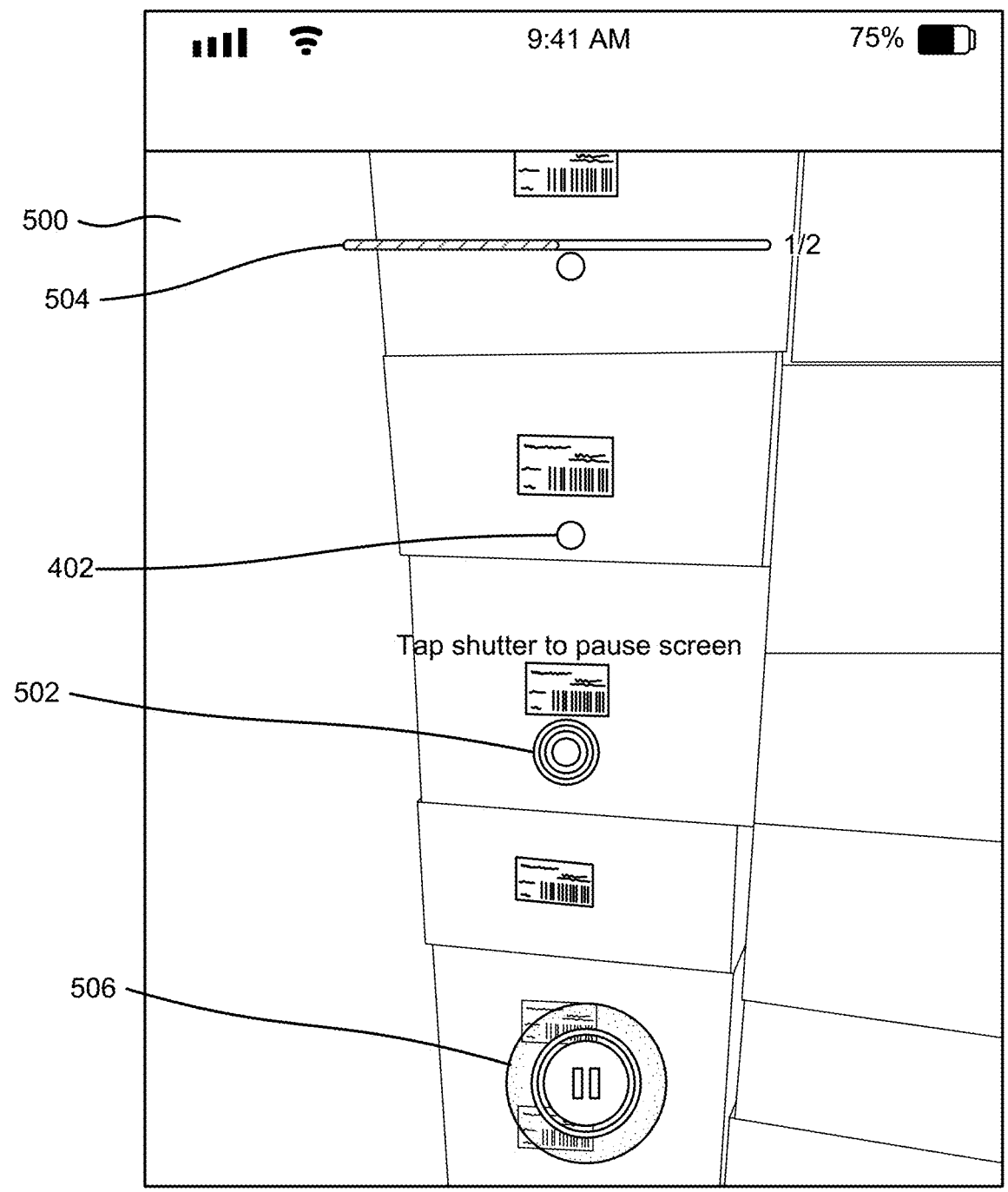
FIG. 5 illustrates an example of a graphical user interface page showing optical patterns that have been matched according to some implementations of the present disclosure.

FIG. 4 illustrates an example of a graphical user interface page 400 showing optical patterns that have been decoded. As shown in FIG. 4, the graphical user interface page 400 can include multiple graphical elements 402 that provide an indication that an optical pattern has been decoded. In some implementations, the graphical elements 402 can be presented in a first color such as white. FIG. 5 illustrates an example of a graphical user interface page 500 showing optical patterns that have been matched. As shown in FIG. 5, the graphical user interface page 500 can include multiple graphical elements 502 that provide an indication that the decoded optical pattern matches the search criteria. In some implementations, the graphical elements 502 can be presented in a second color that is different from the first color such as blue. In this way, the graphic can assist the user in distinguishing optical patterns that have been decoded from optical patterns that have been decoded but also match the search criteria. In some implementations, a graphical element 504 can be presented that provides an indication of a quantity of the optical patterns that have been decoded that match the search criteria. For example, if seven optical patterns have been decoded and four of those seven optical patterns match the search criteria, the graphical element 504 can provide an indication that four of the seven decoded optical patterns match the search criteria. In some implementations, as shown in FIG. 5, the indication can be provided in the form of a progress bar. The foregoing is not intended to be limiting and other indicators such as a graph are possible. In some implementations, the graphical elements can also include a button 506 that, when selected, freezes the real-time display such that the user of the user device 202 can view a still image of the optical patterns that have been decoded and matched.

Figure 6:
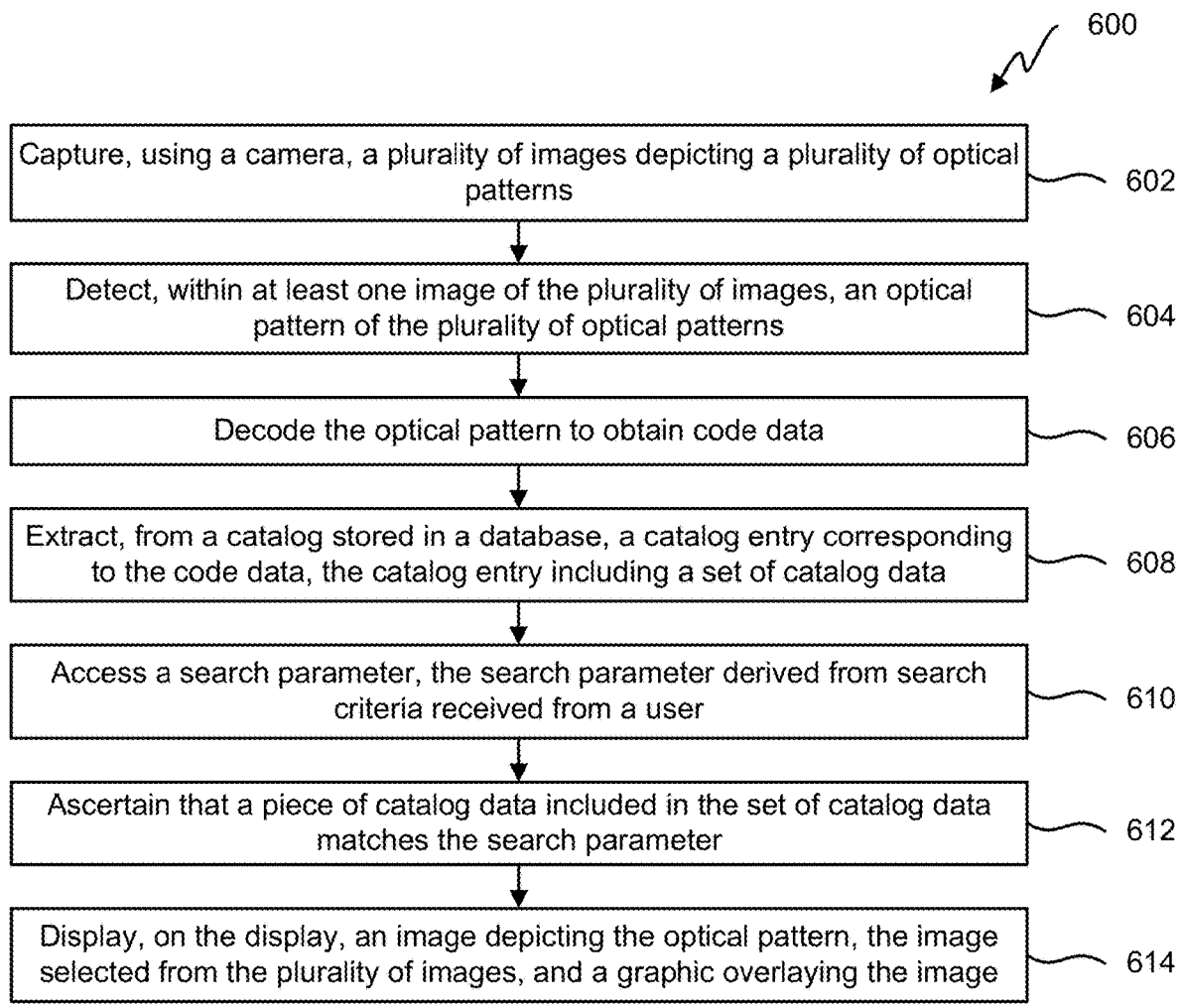
FIG. 6 illustrates a flowchart of an embodiment of a process for finding objects in an environment using optical pattern recognition according to some implementations of the present disclosure.

FIG. 6 illustrates a flowchart of an embodiment of a process 600 for finding objects in an environment using optical pattern recognition. The process depicted in FIG. 6 can be implemented in software (e.g., code, instructions, program) that is executed by a processor such as processor of the computing device 1000 (FIG. 10), a cloud-computing platform, a distributed computing system, a combination thereof, and the like. The software may be stored on a non-transitory computer-readable storage medium (e.g., a memory device). The method 600 is intended to be illustrative and non-limiting. For example, although FIG. 6 depicts the various processing steps occurring in a particular sequence or order, in other implementations, the steps may be performed in some different order or some steps may also be performed in parallel.

At block 602, a plurality of images depicting a plurality of optical patterns is captured. In some implementations, the plurality of images can be captured using a camera. In some implementations, each optical pattern of the plurality of optical patterns is affixed to an object located on a shelf in a retail environment.

At block 604, an optical pattern of the plurality of optical patterns is detected within at least one image of the plurality of images.

At block 606, the optical pattern is decoded to obtain code data.

At block 608, an entry corresponding to the code data is extracted from a database. The entry can include a set of data. In some implementations, the set of data can be stored in a database. In some implementations, the entry comprises a map location for navigating to an object corresponding to the entry.

At block 610, a search parameter is accessed. The search parameter can be derived from search criteria received from a user. The search criteria can be received from a user in response to displaying, on the display, a graphical user interface page for inputting the search criteria. In some implementations, the graphical user interface page includes a section for inputting the search criteria and a section for presenting a textual list of search criteria that has been input. In some implementations, a user can interact with the graphical user interface page to input the search criteria. The search criteria can include, but is not limited to, text describing one or more objects, an image showing one or more objects, and one or more codes associated with one or more objects (e.g., SKU number, barcode, UPC).

At block 612, whether a piece of data included in the set of data matches the search parameter is ascertained.

At block 614, the plurality of images is displayed. In some implementations, a graphic that overlays at least one image of the plurality of images can be displayed. In some implementations, the plurality of images can be displayed on a display.

As described above, a graphical element that can overlay the displayed image includes a button 506 that, when selected, freezes the real-time display such that the user of the user device 202 can view a still image of the optical patterns that have been decoded and matched. In some implementations, the button 506, when selected (e.g., via touch input and/or a voice command), can cause a graphical carousel that includes a list of objects having optical patterns matching the search criteria to overlay the image. In other implementations, a graphical element can also provide an indication that each optical pattern that has been decoded and matches the search criteria has been identified.

Figure 7A:
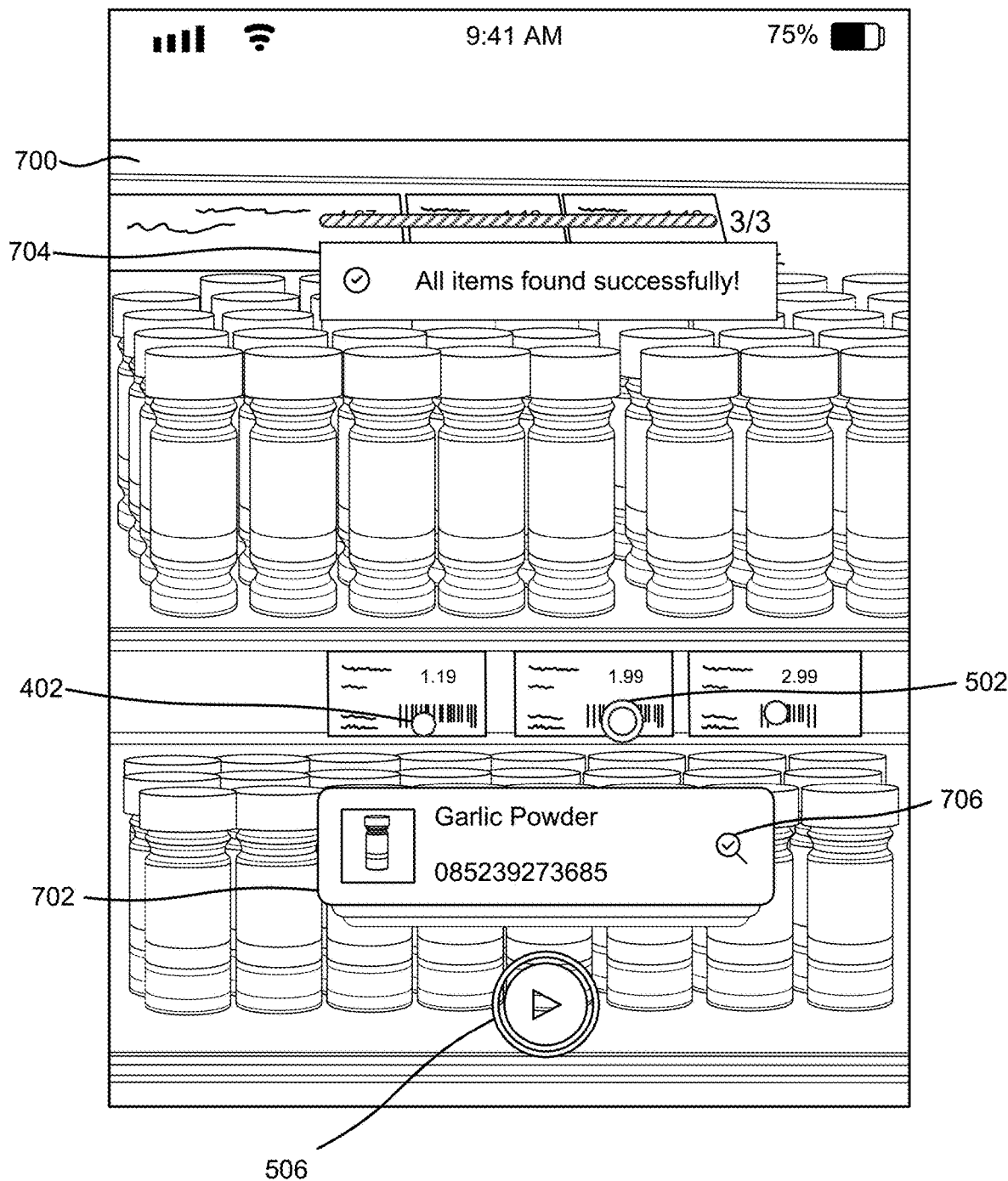
FIG. 7A illustrates an example of a graphical user interface page showing a graphical carousel and a search completion indicator according to some implementations of the present disclosure.

FIG. 7A illustrates an example of a graphical user interface page 700 showing a graphical carousel 702 and a search completion indicator 704. As shown in FIG. 7A, the button 506, when selected (e.g., via touch input and/or a voice command), can cause a graphical carousel 702 that includes a list of objects having optical patterns that have been decoded and/or match the search criteria to overlay the image. The graphical carousel 702 can include slides. Each slide can correspond to one of the objects and include information pertaining to the respective object. In some implementations, each slide can include an image of the respective object, a numerical representation of the optical pattern associated with the respective object, a textual description of the respective object, and an indicator 706 that indicates whether the respective object is an object having an optical pattern that matches the search criteria (e.g., a magnifying glass with a checkmark therein). The user of the user device 202 can interact with the graphical carousel 702 to view the slides. For example, by swiping on the display or using a voice command, the graphical carousel 702 can be navigated to any one of the preceding slides and subsequent slides (e.g., the carousel 702 is a rotating carousel, so that slides in the carousel 702 rotate positions). In this way, a user of the user device 202 can view information pertaining to the objects having optical patterns that have been decoded and/or match the search criteria. As further shown in FIG. 7A, a search completion indicator 704 can provide an indication that each optical pattern that has been decoded and that matches the search criteria has been identified. In this way, a user of the user device 202 can be alerted that the search is completed. In some implementations, the slides in the graphical carousel 702 can be ordered according to the order in which the optical patterns of the respective objects were decoded and/or matched.

Figure 7B:
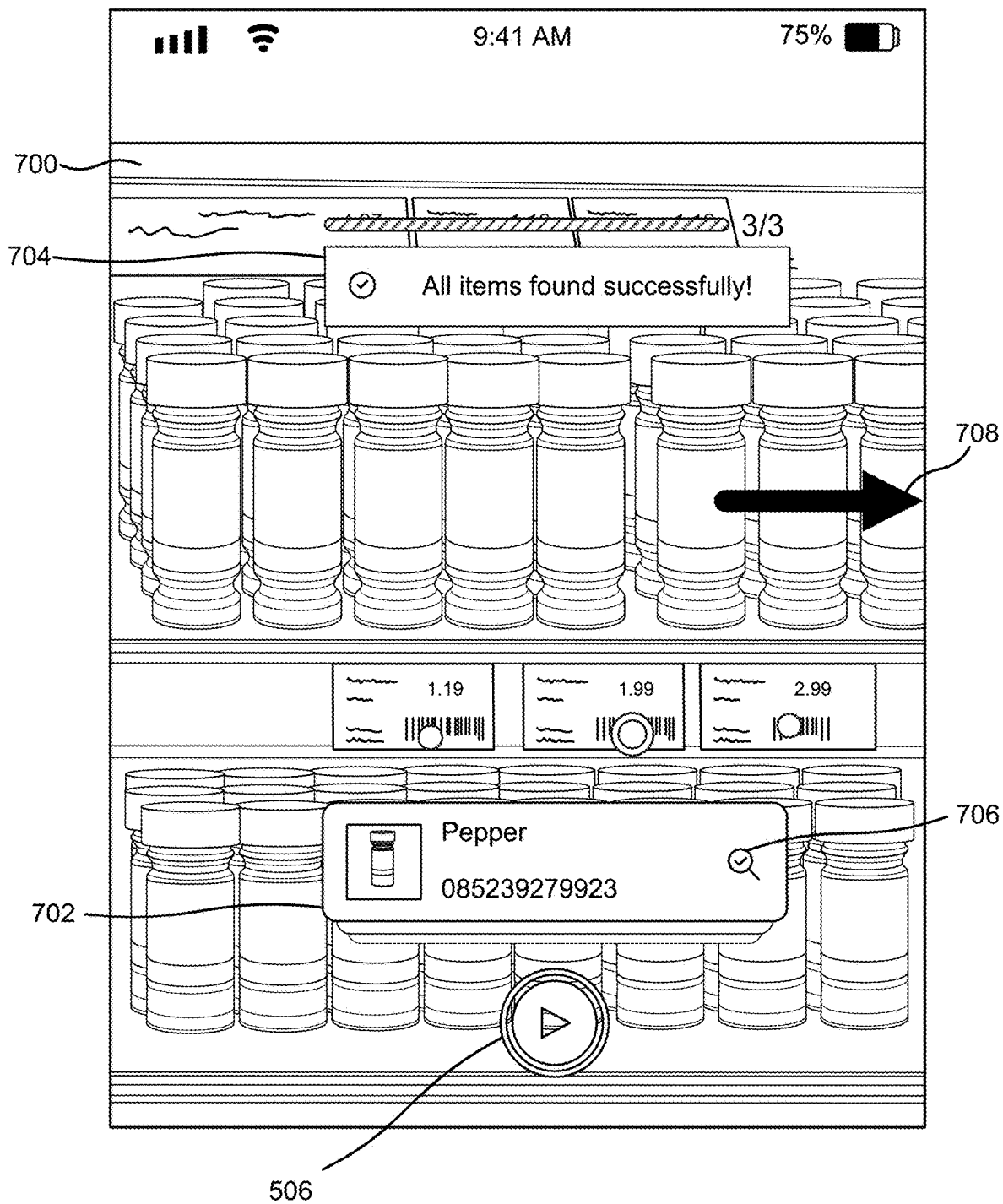
FIG. 7B illustrates another example of a graphical user interface page showing a graphical carousel and a search completion indicator according to some implementations of the present disclosure.

In some implementations, as shown in FIG. 7B, when the graphical carousel 702 is navigated to a slide corresponding to an object having an optical pattern that has been decoded and/or matched to the search criteria and the object is in the live view of the scene, the optical pattern can be overlaid with the corresponding graphical element 402/502. In some implementations, when the graphical carousel 702 is navigated to a slide corresponding to an object having an optical pattern that has been decoded and/or matched to the search criteria and the object is not in the live view of the scene, a graphic overlay 708 can be presented on the display 210 to direct the user how to move the field of view to find the specific object. For example, an arrow could point to the right to indicate to the user to pan the user device 202 to the right to find the specific object. In another example, text (e.g., as an AR graphical overlay) providing instructions (e.g., "move right") can be presented on the display 210 as a graphic overlay on the video preview (or next to the video preview) to aid the user in navigating to the specific object. Alternatively, and/or additionally, when the user selects a graphical element 402/502, the graphical carousel 702 can be navigated to the slide corresponding to the object corresponding to the graphical element 402/502. In some implementations, when the graphical carousel 702 is navigated to a slide corresponding to an object having an optical pattern that has been decoded and/or matched to the search criteria and the object is in the live view of the scene, a graphical element 402/502 associated with the object can change size (e.g., pulse), shape, color, location, and the like. In some implementations, as discussed above, the graphical elements can also include a button 506 that, when selected, freezes the real-time display such that the user of the user device 202 can view a still image of the optical patterns that have been decoded and matched. In some implementations, when the user selects a graphical element 402/502 associated with an optical pattern, a slide corresponding to the optical pattern can be brought to the top of the carousel so that the user can view the information corresponding to the object associated with the optical pattern.

As discussed above, the search criteria can correspond to a shopping list. In some implementations, the slides of the graphical carousel 702 can include information about items on the shopping list. For example, a first slide of the graphical carousel 702 can include information about one item on the shopping list and a second slide of the graphical carousel 702 can include information. In some implementations, the user can view the slides of the graphical carousel 702 to see items in the shopping list and navigate to those items. For example, a user can be navigated to a specific item on a shelf by holding up the user device 202 to capture images of the shelf. In some implementations, to assist the user of the user device 202 pick out items on the shopping list, each slide can include an indicator 706 (e.g., a magnifying glass with a checkmark therein) that indicates whether the respective object is an object having an optical pattern that matches an item on the shopping list. In some implementations, the indicator 706 provides an indication that an object that matches the search criteria is depicted in at least one image previously captured by the camera 204. For example, when the workflow starts, items potentially matching the search criteria would be included in the slides of the graphical carousel 702 but none would include the indicator 706 and, as the user looks around the scene and optical patterns are decoded, as soon as an optical pattern that is decoded matches the search criteria, the indicator 706 can be added to the slide corresponding to the optical pattern. In this case, even if the user device 202 is moved away from the scene and the item leaves the field of view, the indicator 706 can persist on the slide.

As described above, the database 212 can store a map of the environment and map coordinates for objects included in the catalog that can be used to identify where in the environment the objects are located. The map coordinates can identify where the object is located in the environment with respect to a reference location in the map coordinate system and/or where the object is located in the environment with respect to the location of a reference object in the environment. The map coordinates can also identify, in the case of an environment including a shelving system, which shelf the object is located on and where on the shelf the object is located. As also described above, the captured images can be displayed in real-time such that the user of the user device 202 can be presented with a viewfinder and/or live view of the scene and use the viewfinder and/or live view of the scene to navigate through the retail environment.

To assist the user of the user device 202, a graphical user interface page that includes a map of the environment can be presented to the user of the user device 202 using display 210. In some implementations, navigation is aided with a graphic that overlays an image that is being displayed. For example, a user can be navigated to a specific item on a shelf by holding up the user device 202 to capture images of the shelf. A live view or video preview of the shelf can be presented on the display 210 of the user device 202. If the specific object (e.g., an object having an optical pattern matching the search criteria) is not within a field of view of the camera 204 of the user device 202, a graphic overlay can be presented on the display 210 to direct the user where to move to find the specific object. For example, a red arrow could point up and to the right to indicate to the user to move the user device 202 up and to the right to find the specific object. In another example, text (e.g., as an AR graphical overlay) providing instructions (e.g., "move two aisles forward," "move three aisles backward," move to aisle A17," or "Next: Dairy") can be presented on the display 210 as a graphic overlay on the video preview (or next to the video preview) to aid the user in navigating to the specific object. In some implementations, the finder unit 208 of the user device 202 can be configured to calculate a position of the user device 202 within the environment by decoding a barcode within the video preview to obtain a SKU, reference the SKU to a location in a store map (e.g., by extracting a catalog entry from the catalog of object stored in the database 212, as described above), calculating the position of the user device 202 within the environment based on a location of the barcode relative to the user device 202 and the specific object.

In some implementations, a map of the environment can be created using relative locations of barcodes on shelves and/or in the environment (e.g., as discussed in commonly owned U.S. patent application Ser. No. 18/053,991, filed on Nov. 9, 2022, which is incorporated by reference in its entirety for all purposes). In some implementations, visual odometry can be used for navigation within the environment (e.g., as discussed in commonly owned U.S. patent application Ser. No. 17/890,087, filed on Aug. 17, 2022, which is incorporated by reference in its entirety for all purposes).

Figure 8A:
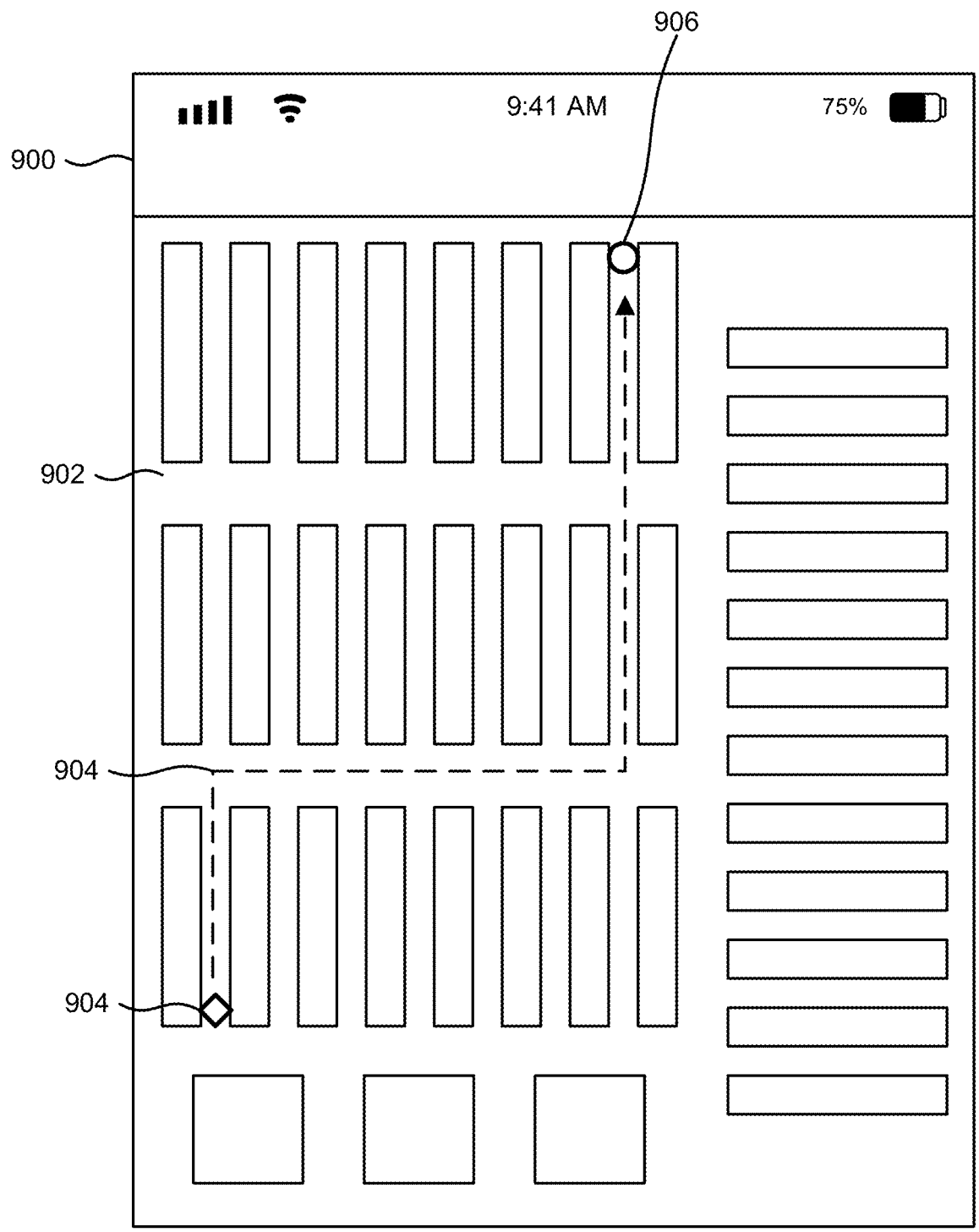
FIG. 8A illustrates an example of a graphical user interface page for navigating to an object according to some implementations of the present disclosure.
Figure 8B:
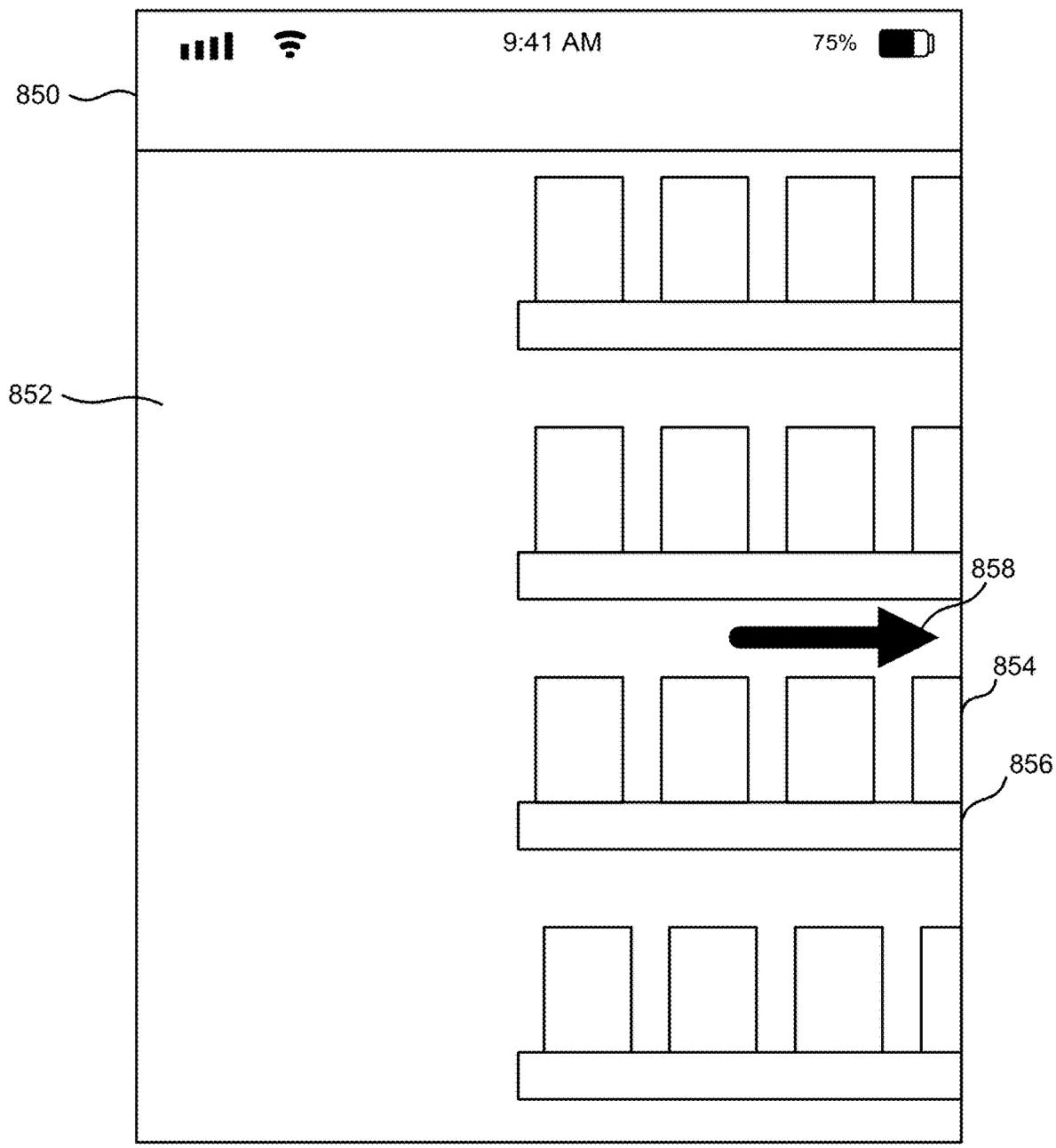
FIG. 8B illustrates another example of a graphical user interface page for navigating to an object according to some implementations of the present disclosure.

FIG. 8A illustrates an example of a graphical user interface page 800 for navigating to an object. As shown in FIG. 8A, the graphical user interface page 800 can include a map 802. The map 802 can include a present location indicator 804 for indicating to the user of the user device 202 where the user device 202 is currently located in the environment and a destination location indicator 806 for indicating to the user where the user should navigate to. The map 802 can also include one or more directional indicators 808 for indicating to the user a path for navigating from the location corresponding to the present location indicator 804 to the destination location indicator 806. FIG. 8B illustrates another example of a graphical user interface page 850 for navigating to an object. As shown in FIG. 8B, the graphical user interface page 850 can include a live view of the scene 852 including objects 854 on shelves 856. The graphical user interface page 850 can include a directional indicator 858 for indicating to the user which direction the user should navigate and/or pan the camera 204 of the user device 202 to.

As described above, techniques are described herein for finding objects in an environment using optical pattern recognition. In some implementations, the techniques described herein can be used to assist a user in picking objects from a selection of objects. For example, in an online order fulfillment scenario, employees can use the techniques described herein to pick objects corresponding to the order from a selection of objects and place them in a bin designated for those objects. The techniques described herein can assist users by navigating the users to the objects that should be picked from the selection of objects and which bin or bins the user should place the picked objects. In many cases, the bins look the same and are affixed with barcodes, which can cause difficulty for the user in determining which bin to place a picked object.

Figure 9:
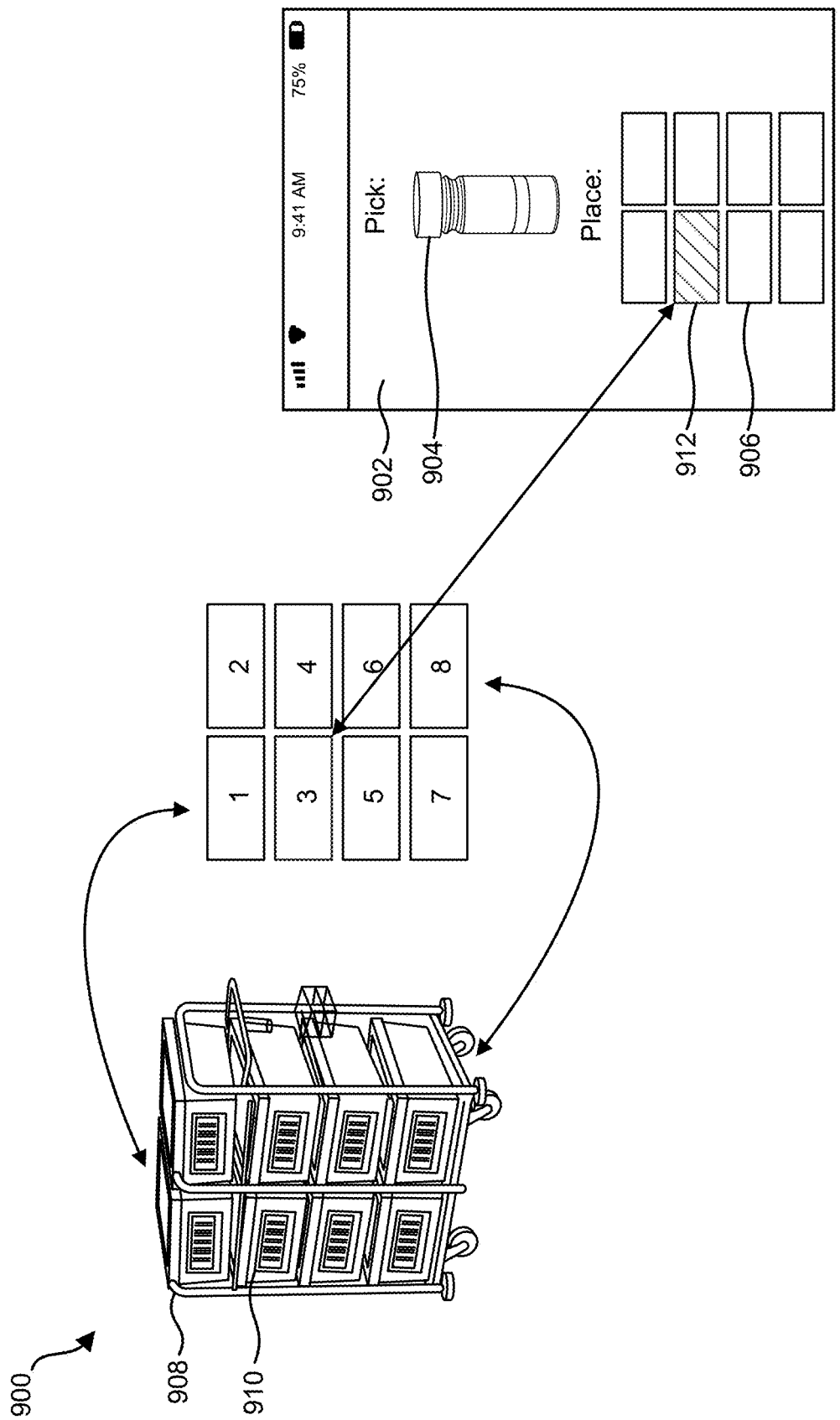
FIG. 9 illustrates a scenario for picking objects according to some implementations of the present disclosure.

FIG. 9 illustrates an example scenario for picking objects. As shown in FIG. 9, in an example scenario 900, a user (not shown) can move a cart 908 including bins 910 around an environment such as the retail environment described above. While moving the cart 908 around the environment, the user can use the user device 202 to select objects matching search criteria from the shelves in the environment and place them in designated bins 910. As shown in FIG. 9, the bins 910 can look the same and include barcodes, which can cause difficulty for the user in determining the correct bin in which to place the selected object. To overcome this challenge, the user can use the user device 202 to capture an image or images of the bins 910 to decode the barcodes on the bins 910 and generate a graphical user interface page 902 that shows a representation 906 of the bins 910. In some implementations, images of the bins can be captured sequentially and in a predetermined order. For example, the user can capture an image of the top-left bin first, then the top-right bin, then the leftmost-bin just below the top-left bin, and so on. In this way, the representation 906 of the bins 910 included in the graphical user interface page 902 can represent the arrangement of the bins 910 is the real-world. In some implementations, once the bin arrangement in the real-world is represented in the graphical user interface page 902, the user can use the user device 202 to pick an object 904 matching the search criteria as described above. In some implementations, an indicator 912 can be provided to indicate to the user which bin the picked object 904 should be placed into. The designated bin can be determined based on an online order the user is fulfilling. The foregoing examples are not intended to be limiting and the bin placing techniques described herein can be used in other scenarios.

FIG. 10 is a simplified block diagram of a computing device 1000. Computing device 1000 can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1010 for implementing one or more method steps described above.

A firmware and/or software implementation may be implemented with modules (e.g., procedures, functions, and so on). A machine-readable medium tangibly embodying instructions may be used in implementing methodologies described herein. Code modules 1010 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1010 on a general-purpose computer system, the general purpose computer is transformed into a special purpose computer system.

Computer programs incorporating various features described herein (e.g., in one or more code modules 1010) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single-core or multi-core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1000.

Various features described herein, e.g., methods, apparatus, computer-readable media, and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system comprising:
   a camera; and
   a computer readable storage medium storing instruction that, when executed by one or more processors, cause the system to perform operations comprising:
   capturing, using the camera, a plurality of images depicting a plurality of optical patterns in a scene, each optical pattern of the plurality of optical patterns corresponding to an object of a plurality of objects in the scene;
   decoding, within the plurality of images, the plurality of optical patterns in the scene to obtain a plurality of code data for the plurality of optical patterns;
   extracting, from a database and based on the plurality of code data, a plurality of entries, each entry of the plurality of entries corresponding to a respective object of the plurality of objects;
   accessing a search parameter, the search parameter derived from search criteria provided as input using a graphical user interface page, wherein the search parameter comprises a barcode corresponding to the search criteria;
   comparing the barcode to barcodes included in sets of data associated with the plurality of entries;
   ascertaining that the search parameter matches particular barcodes of the barcodes; and
   in response to ascertaining that the search parameter matches the particular barcodes, displaying, on a display, a preview image of a portion the scene and a graphical overlay that overlays the preview image, the graphical overlay comprising: (i) a first graphic that distinguishes an optical pattern depicted by the preview image and associated with the particular barcodes from another optical pattern depicted by the preview image; (ii) a second graphic that provides an indication of a quantity of optical patterns depicted by the preview image that are associated with the particular barcodes; (iii) a third graphic that identifies optical patterns depicted by the preview image that are not associated with the particular barcodes, wherein the first graphic is different from a color of third graphic; (iv) a fourth graphic that provides a notification that optical patterns that are depicted by the preview image and associated with the particular barcodes have been found; (v) a slide of a graphical carousel that comprises a plurality of slides, wherein the slide includes an image of an object associated with the optical pattern, text describing the object, and code data representing the optical pattern; and (vi) a button that, when toggled, causes the graphical carousel to overlay the preview image.

2. A method comprising:
capturing, using a camera, a plurality of images depicting a plurality of optical patterns in a scene, each optical pattern of the plurality of optical patterns corresponding to an object of a plurality of objects in the scene;
decoding, within the plurality of images the plurality of optical patterns in the scene to obtain a plurality of code data for the plurality of optical patterns;
extracting, from a database and based on the plurality of code data, a plurality of entries, each entry of the plurality of entries corresponding to a respective object of the plurality of objects;
accessing a search parameter, the search parameter derived from search criteria provided as input using a graphical user interface page, wherein the search parameter comprises a barcode corresponding to the search criteria;
comparing the barcode to barcodes included in sets of data associated with the plurality of entries;
ascertaining that the search parameter matches particular barcodes of the barcodes; and
in response to ascertaining that the search parameter matches the particular barcodes, displaying, on a display, a preview image of a portion of the scene and a graphical overlay that overlays the preview image, the graphical overlay comprising a graphic that distinguishes a first optical pattern depicted by the preview image and associated with the particular barcodes from a second optical pattern depicted by the preview image, a slide of a graphical carousel comprising a plurality of slides, the slide including an image of an object associated with a third optical pattern that is not depicted by the preview image, and a directional indicator providing an indicating of a direction in which the camera should be panned to capture a preview image of the third optical pattern.

3. The method of claim 2, wherein the graphic is a first graphic, and wherein the graphical overlay comprises a second graphic that identifies optical patterns depicted by the preview image that are not associated with the particular barcodes.

4. The method of claim 2, wherein the graphic is a first graphic, and wherein the graphical overlay comprises a second graphic that provides an indication of a quantity of optical patterns depicted by the preview image that are associated with the particular barcodes.

5. The method of claim 2, wherein the graphic is a first graphic, and wherein the graphical overlay comprises a second graphic that provides a notification that optical patterns that are depicted by the preview image and associated with the particular barcodes have been found.

6. The method of claim 2, wherein the graphical overlay comprises a button that, when toggled, causes the graphical carousel to overlay the preview image.

7. The method of claim 2, wherein a search criterion of the search criteria comprises a stock-keeping-unit number associated with the barcode and information describing a search object.

8. The method of claim 2, wherein each optical pattern of the plurality of optical patterns is affixed to an object located on a shelf in a retail environment.

9. The method of claim 2, wherein each respective entry of the plurality of entries comprises a map location for navigating to an object corresponding to the respective entry.

10. The method of claim 2, wherein the directional indicator is an arrow.

11. The method of claim 10, further comprising displaying, on the display, a map of an environment in which the plurality of objects is located.

12. The method of claim 2, wherein at least one slide of the plurality of slides corresponds to an item on a shopping list.

13. One or more non-transitory computer-readable media storing computer-readable instructions that, when executed by one or more processors, cause a system to perform operations comprising:
    capturing, using a camera, a plurality of images depicting a plurality of optical patterns in a scene, each optical pattern of the plurality of optical patterns corresponding to an object of a plurality of objects in the scene;
    decoding, within the plurality of images, the plurality of optical patterns in the scene to obtain a plurality of code data for the plurality of optical patterns;
    extracting, from a database and based on the plurality of code data, a plurality of entries, each entry of the plurality of entries corresponding to a respective object of the plurality of objects;
    accessing a search parameter, the search parameter derived from search criteria provided as input using a graphical user interface page, wherein the search parameter comprises a barcode corresponding to the search criteria;
    comparing the barcode to barcodes included in sets of data associated with the plurality of entries;
    ascertaining that the search parameter matches particular barcodes of the barcodes; and
    in response to ascertaining that the search parameter matches particular barcodes, displaying, on a display, a preview image of a portion of the scene and a graphical overlay that overlays the preview image, the graphical overlay comprising a slide of a graphical carousel comprising a plurality of slides, the slide including an image of an object associated with an optical pattern depicted by the preview image, text describing the object, and code data representing the optical pattern.

14. The one or more non-transitory computer-readable media of claim 13, the operations further comprising:
    in response to ascertaining that the search parameter does not match particular barcodes, displaying, on the display, a directional indicator providing an indicating of a direction in which the camera should be panned.

15. The one or more non-transitory computer-readable media of claim 13, wherein the preview image is a first preview image, wherein the portion of the scene is a first portion, and wherein the graphical overlay is a first graphical overlay, and the operations further comprising:
    displaying, on the display, a second preview image of a second portion of the scene and a second graphical overlay that overlays the second preview image.

16. The one or more non-transitory computer-readable media of claim 15, wherein the second graphical overlay comprises a graphic that distinguishes an optical pattern depicted by the second preview image and associated with the particular barcodes from another optical pattern depicted by the second preview image.

17. The one or more non-transitory computer-readable media of claim 14, wherein the directional indicator is an arrow.

18. The one or more non-transitory computer-readable media of claim 13, the operations further comprising displaying, on the display, a map of an environment in which the plurality of objects is located.

19. The one or more non-transitory computer-readable media of claim 13, wherein at least one slide of the plurality of slides corresponds to an item on a shopping list.

20. The one or more non-transitory computer-readable media of claim 13, wherein the graphical overlay comprises a button that, when toggled, causes the graphical carousel to overlay the preview image.

* * * * *